3,417,124
PREPARATION OF AROMATIC NITRILES BY THE LIQUID PHASE DEHYDRATION OF AMIDES
Charles F. Kohll and Nanno Fekkes, Amsterdam, Netherlands, assignors to Shell Oil Company, New York, N.Y., a corporation of Delaware
No Drawing. Filed Apr. 8, 1966, Ser. No. 541,094
Claims priority, application Netherlands, Apr. 23, 1965, 6505181
7 Claims. (Cl. 260—465)

ABSTRACT OF THE DISCLOSURE

Dehydration of aromatic mono- and di-carboxamides to aromatic mono- and di-nitriles by liquid phase reaction with an anhydride of an alkane or monochloroalkane mono- or di-carboxylic acid in the presence of a metal salt of a weak organic acid, preferably in the presence of a weak organic acid.

---

This invention relates to a process for the manufacture of aromatic nitriles from the corresponding carboxamides.

2,6-dichlorobenzonitrile is a useful herbicide, and further, is readily converted to 2,6-dichlorothiobenzamide, another very useful herbicide of different biological properties. Therefore, it is desirable that a process for commercial production of 2,6-dichlorobenzonitrile be available. The process of this invention offers a process for the efficient production of this nitrile on a large scale.

Further, it has been found that this process is generally applicable to the conversion of aromatic carboxamides to the corresponding nitriles.

According to the process of the invention, an aromatic carboxamide is readily converted to the corresponding nitrile by dehydration with an anhydride of an aliphatic mono- or di-carboxylic acid of no more than 12 carbon atoms, in the presence of a metal salt, the metal cation being one of a transition metal of Groups I–B, II–B, VI–B, VII–B or VIII of the Periodic Chart of the Elements, Merck and Company, Revised, July 1957, and the anion that of a weak organic acid.

As has already been mentioned, the process of the invention is applicable generally to aromatic carboxamides, R$(CONH_2)_n$, where $n$ is a whole number, 1 or greater, and R is the aromatic moiety. The aromatic moiety suitably can be carbocyclic mononuclear—i.e., phenyl—or polynuclear—e.g., naphthyl, phenanthryl, or the like—or heterocyclic—e.g., pyridyl or pyrrolyl. It suitably is unsubstituted, or substituted by from one to a plurality of substituents selected from chlorine, bromine and iodine, alkyl and alkoxy of from 1 to 6 carbon atoms, and nitro. Because of the utility of the products, the mononuclear carbocyclic carboxamides are a preferred subclass, with those substituted by chlorine or bromine on at least one of the carbon atoms of the aromatic ring ortho in position relative to the carbon atoms to which the —$CONH_2$ moiety is bonded, being particularly preferred as providing products of marked utility as herbicides. A still more preferred subclass is that in which the carbon atom in the other ortho position in the ring is bonded to chlorine or bromine, methyl, methoxy or nitro, since the nitriles prepared therefrom have very high herbicidal activity. The process of the invention is of particular value for preparing the nitriles from 2-chlorobenzamide, 2,6-dichlorobenzamide, 2,3,6-trichlorobenzamide, 6-chloro-2-nitrobenzamide, 6-chloro-2-methoxybenzamide and tetrachloroterephthalamide.

The anhydride used to effect dehydration of the amide is defined generally as an aliphatic mono- or di-carboxylic acid anhydride of up to 12 carbon atoms. Preferred because of their availability and solubility in the reaction mixture are the saturated acids—that is, the alkane mono- and dicarboxylic acids. In these acids, the alkane moiety may be unsubstituted, or it may be substituted by from one to a plurality of substituents selected from: chlorine, bromine, iodine, alkoxy, nitro, and hydroxy. The anhydride may be derived from a single acid or from two or more acids. The alkyl moiety may be of straight-chain or branched-chain configuration. Examples of suitable anhydrides include: acetic acid anhydride, propionic acid anhydride, monochloroacetic acid anhydride, succinic acid anhydride and the mixed anhydrides of acetic acid and propionic acid. Acetic acid anhydride is preferred.

At least one mole of the anhydride is to be used per equivalent of —$CONH_2$ to be converted, with from about 1.2 to about 15 moles of anhydride per equivalent of —$CONH_2$ being suitable, and from about 4 to 6 moles of anhydride per equivalent of —$CONH_2$ being preferred.

While the anhydride alone is suitable, it has been found advantageous to carry out the dehydration in the presence of the acid or acids corresponding to the anhydride, the combination of acetic anhydride and acetic acid being preferred. Suitably, the mole ratio of anhydride to acid lies in the range of from about 0.1 to about 5, with ratios of from about 0.5 to about 1.0 being best in most cases.

Salts of weak acids and transition metals of Groups I–B, II–B, VI–B, VII–B and VIII of the Periodic Chart of the Elements are used as catalysts in the process of the invention. Of particular value are the salts of metals of the fourth Period, including copper, zinc, manganese, iron, cobalt and nickel, and cadmium from the fifth Period. Especially effective are the salts of nickel, zinc and copper. The anion of the salts is derived from a weak acid, particularly those having a pK higher than 2. The suitable anion is that which is of suitable acidity and which is stable in the reaction mixture. Preferred are the organic acids, which may suitably be aliphatic, aromatic or mixed in character, and unsubstituted or substituted by hydrocarbon or non-hydrocarbon substituents such as halogen, hydroxy, nitro, alkoxy, cyano or the like. Anions of lower molecular weight acids—for example, containing up to 15 carbon atoms—are most suitable. Preferably, the anion is that of a lower alkane monocarboxylic acid, and to reduce the number of different kinds of ions in the reaction mixture, it is most preferred that the anion be the same as that of the anhydride and acid employed in the reaction. If desired, a mixture of the metal salts can be employed.

In some cases, it may be advantageous to form the catalyst in situ. In such cases, an inorganic compound of the metal can be used, including, for example, the oxides, hydroxides, carbonates or nitrates. Essentially any substantially water-soluble salt is suitable, except the chlorides and sulfates. In the cases of these latter salts, it has been found that undesirable side-reactions tend to occur, probably because of the strength of the acid formed from the anion.

It is generally necessary to employ at least 0.01 mole of metal per gram-equivalent of each —CONH$_2$ group to be dehydrated. Little additional advantage will accrue from the use of more than about 0.20 mole metal per each —CONH$_2$ group. In most cases, it will be found best to employ from about 0.03 to about 0.12 mole of metal per each —CONH$_2$ group.

The dehydration progresses readily by heating the reaction mixture at from about 100° C. to about 200° C., preferably within the range of about 120–160° C. Preferably, the reaction is carried out at the boiling temperature of the mixture and under reflux conditions.

The reaction normally can be readily carried out at atmospheric pressure. However, in some cases, it may be found desirable to conduct the reaction under pressure, to insure a liquid reaction mixture at a temperature sufficiently high to provide good reaction rate.

The manner in which the reaction mixture can be worked up to isolate the desired product is illustrated in the working examples which follow. These examples of course also illustrate conduct of the process of the invention in particular instances. In these examples, "parts" means parts by weight unless otherwise designated, and parts by weight bear the same relationship to parts by volume as does the kilogram to the liter.

EXAMPLE I

In a reaction vessel provided with stirrer and reflux condenser a mixture of 20 parts by volume of acetic anhydride and 5 parts by volume of glacial acetic acid was poured over 5 parts of 2,6-dichlorobenzamide (DCBAM) to which 10% M (0.48 part) of zinc acetate had been added, and the resulting mixture was boiled for five hours under reflux conditions (130–135° C.). Next, the solvent was removed by heating in vacuo (100 torr.) at a bath temperature of 60° C. The residue thus obtained was recrystallized from methanol. The yield of 2,6-dichlorobenzonitrile (DCBN) amounted to 4.14 parts, which corresponds to 92% of theory.

EXAMPLE II

In a manner analogous to the one described in Example I 2,6-dichlorobenzamide (DCBAM) was dehydrated in the presence of acetates of various transition metals. These reactions were carried out in a medium consisting of equal volumes of acetic anhydride and glacial acetic acid. Table I gives the yields of 2,6-dichlorobenzonitrile (DCBN) which were obtained with equal molar quantities (10% M) of the catalysts concerned, the yields being determined by gas-chromatographic analysis.

Table I.—Dehydration of 5 parts of DCBAM in 20 parts by volume of Ac$_2$O/AcOH (1:1 v./v.) with 10% M of catalyst at 130–135° C. for 5 hours

| Catalyst: | Yield (DCBN), percent M |
|---|---|
| Fe(OAc)$_3$/LiCl [1] | 70 |
| Co(OAc)$_2$ | 81 |
| Cd(OAc)$_2$ | 82 |
| Zn(OAc)$_2$ | 90 |
| Cu(OAc)$_2$ | 90 |
| Ni(OAc)$_2$ | 93 |

[1] Molar ratio 1:1. The LiCl was added to make the catalyst soluble.

EXAMPLE III

Under conditions similar to those mentioned in Example I 2,6-dichlorobenzamide (DCBAM) was dehydrated in the presence of various quantities of zinc acetate. The yield of 2,6-dichlorobenzonitrile (DCBN) was in all cases determined by gas-chromatographic analysis of the residue obtained. As appears from Table II, the yield increases considerably with the amount of catalyst.

Table II.—Dehydration of 5 parts of DCBAM dissolved in 20 parts by volume of Ac$_2$O+5 parts by volume of AcOH for 5 hours at 130–135° C.

| Catalyst, percent M: | Yield of DCBN, percent M |
|---|---|
| — | 50 |
| 2 | 63 |
| 6 | 76 |
| 10 | 93 |
| 15 | 91 |

EXAMPLE IV

In a manner analogous to the one described in Example I 5 parts of 2,6-dichlorobenzamide (DCBAM) was converted into 2,6-dichlorobenzonitrile (DCBAM) in the presence of 10% M of zinc acetate, or zinc oxide. As appears from Table III, keeping the mixing ratio of acetic anhydride to glacial acetate acid between certain limits, as well as the reaction time, have a favourable influence on the yield.

Table III.—Dehydration of DCBAM in the presence of 10% M of Zn(OAc)$_2$ in Ac$_2$O—ACOH mixtures

| Acetic anydride, parts by volume | Glacia aceticl acid, parts by volume | Temperature, °C | Time, hours | Yield of DCBN, percent M |
|---|---|---|---|---|
| 25 | — | 140 | 5 | 87 |
| 20 | 5 | 130–135 | 5 | 92 |
| 15 | 10 | 130–135 | 5 | 93 |
| 10 | 15 | 130–135 | 5 | 93 |
| 5 | 20 | 130 | 5 | 87 |
| 10 | 10 | 130–135 | 1 | 73 |
| 10 | 10 | 130–135 | 3 | 86 |
| 10 | 10 | 130–135 | 5 | 92 |
| 10 | 10 | 130–135 | 5 | [1] 91 |

[1] In this experiment ZnO was applied instead of Zn(OAc)$_2$.

We claim as our invention:

1. A process for the preparation of aromatic nitriles of the structure

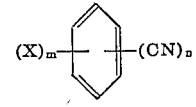

wherein X is chlorine, bromine, methyl, methoxy or nitro; $m$ is 0, 1, 2 or 3, and $n$ is 1 or 2, comprising reacting in liquid phase an aromatic carboxamide of the structure

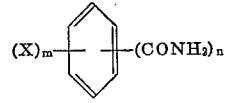

wherein X, $m$ and $n$ are as described above, with an anhydride of an alkane or mono-chloro substituted alkane mono- or dicarboxylic acid containing no more than eight carbon atoms, in the presence of a transition metal salt of a weak organic acid of a pK higher than 2 wherein the metal cation is a Cu, Zn, Cd, Fe, Co or Ni ion, and the anion is derived from the same organic acid from which the above anhydride is derived; and wherein about 1.2 to 15 moles of anhydride is used per equivalent of —CONH$_2$ of the above starting compound, and about 0.01 mole to about 0.20 mole of metal salt is used per equivalent of —CONH$_2$ of the above starting compound; at a temperature of between about 100° C. to about 200° C.

2. A process according to claim 1 wherein the reaction is conducted in the presence of added acid corresponding to the anhydride.

3. A process according to claim 2 wherein the carboxamide is a 2-chloro- or 2-bromobenzamide, the anhydride is the anhydride of a lower alkane monocarboxylic acid, the reaction is carried out in the presence of added acid corresponding to the anhydride, and the metal is one of nickel, zinc and copper, the anion thereof corresponding to the acid.

4. A process according to claim 3 wherein the carboxamide also contains a 6-substituent selected from bromine, chlorine, methyl, methoxy and nitro.

5. A process according to claim 4 wherein the anhydride is acetic anhydride, the acid is acetic acid and the metal salt is the metal acetate.

6. A process according to claim 5 wherein the carboxamide is 2,6-dichlorobenzamide.

7. A process according to claim 6 wherein the metal salt is zinc acetate.

References Cited

UNITED STATES PATENTS

| | | | |
|---|---|---|---|
| 2,205,076 | 6/1940 | Wortz | 260—65.2 X |
| 2,288,687 | 7/1942 | Dreyfus | 260—65.2 X |

FOREIGN PATENTS 323,948  1/1930  Great Britain.

OTHER REFERENCES

Lawton et al.: Journal of Organic Chemistry, vol. 24, pp. 26–28.

CHARLES B. PARKER, *Primary Examiner.*

S. T. LAWRENCE III, *Assistant Examiner.*

U.S. Cl. X.R.

71—105; 260—294.9, 313, 326.5